Oct. 19, 1926.
E. M. SCHANTZ
1,603,296
CHART FOR PIANO INSTRUCTION
Filed Dec. 7, 1923
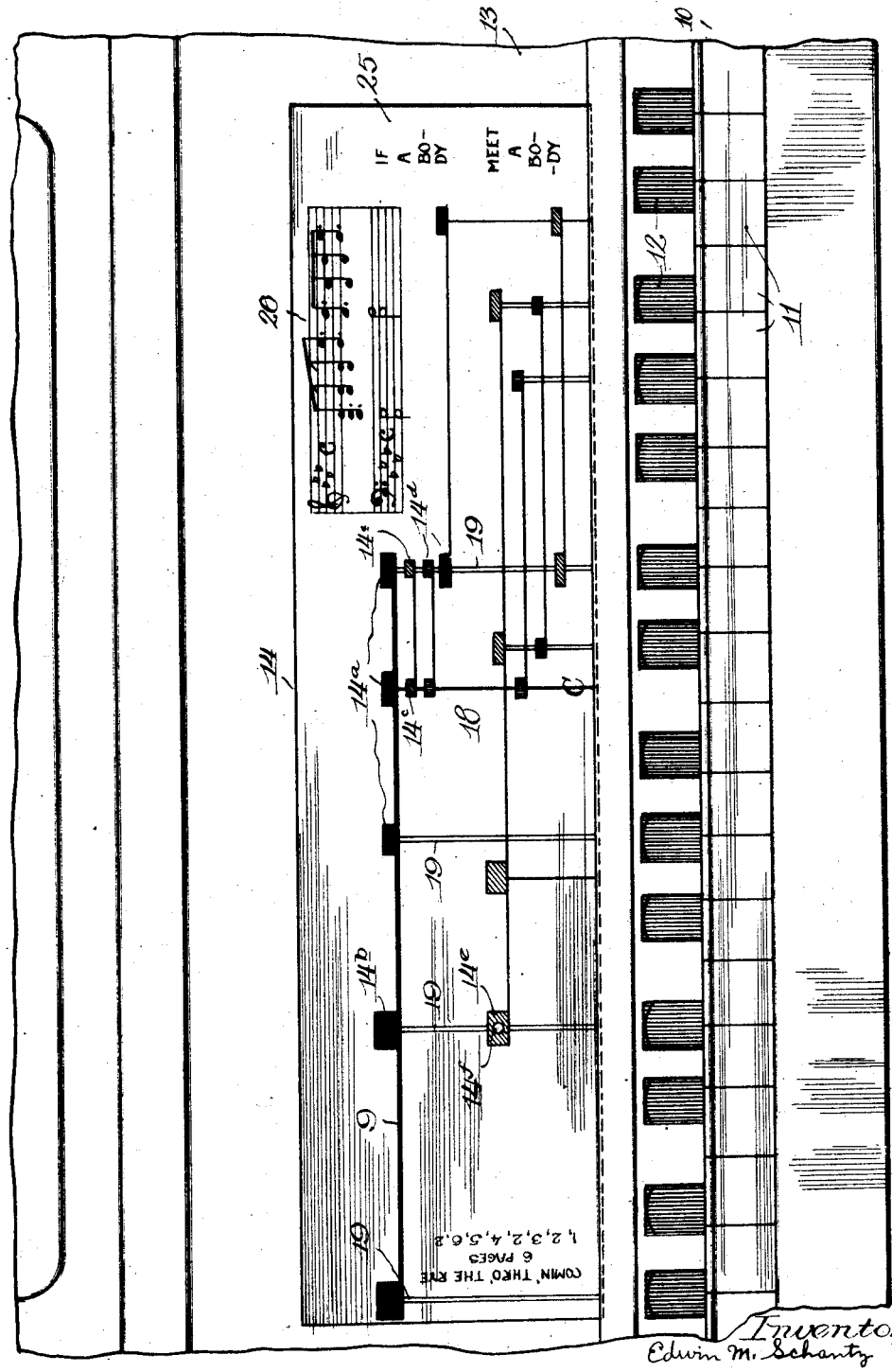

Patented Oct. 19, 1926.

1,603,296

UNITED STATES PATENT OFFICE.

EDWIN M. SCHANTZ, OF CHICAGO, ILLINOIS.

CHART FOR PIANO INSTRUCTION.

Application filed December 7, 1923. Serial No. 679,052.

This invention relates to improvements in charts for piano instruction, and has for its object to provide charts which may be positioned relative to the key-board of a piano, or the like, in such wise that the keys to be depressed are indicated in a simple manner to the user enabling him to position his fingers on the keys without difficulty, and thereby depress keys for the proper chords and notes in succession in the playing of a musical composition.

Another object consists in the provision of a chart of this character in which succeeding chords or groups of notes are indicated in different colors to enable the user to quickly pass from one chord or note to the next succeeding chord or note without confusion.

Another object consists in the provision of a chart of this character which may be subdivided into sections, each section comprising a group of notes, as for example, a phrase or stanza of a song, so that where one unit group is repeated in the rendition of a piece of music, the said section corresponding to that group need not be duplicated but the one section will be available for repeated playing.

Another object consists in the provision of a chart of this character in which the relative value of the notes is indicated; also, notes as played by the left hand are differently characterized.

Another object consists in the combination of groups of actual printed notes for use in conjunction with the corresponding unit section of the chart so that the pupil using the chart may obtain a mental impression of the actual notes which will assist in learning to play from conventionally printed music.

Still another object consists in the printing of the words of the song with the chart section upon which the corresponding indicated notes or characterizations are printed.

These and other objects will be more fully described in the following specification and shown in the appended drawings.

10 indicates, generally, the keyboard having the usual white keys 11 and the black keys 12 with the panel 13 in the rear. 14 indicates a section of a chart constructed according to my invention printed to instruct a pupil in the playing of a portion of "Comin' Thru the Rye." This chart is preferably constructed of stiff cardboard, or the like, and when used is placed upon the keyboard 10 against the panel 13 so as to be placed directly over the notes. To properly position this chart, middle C is painted on the chart as indicated over the leader, which will be in line with the corresponding note on the keyboard. The uppermost lateral group of indications in the chart shown comprises the printed blocks $14^a$ and $14^b$ printed in black, the lateral groups representing one word of the first note or stanza of the song, the notes preferably played with the right hand are of less thickness and are indicated by numeral $14^a$, while the left hand notes are thicker, these being the notes indicated by numeral $14^b$. Vertical leaders 18 and 19 extend downwardly from the note indications, leader 18 being a single line to indicate white keys, while leader 19 is double lined to indicate black keys. The next subsequent lateral group comprises note marks $14^c$ which are colored blue, while the third group of notes indicated by numeral $14^d$ are indicated in red. This cycle of colors being for the purpose of enabling the eyes of the user to place the proper groups in sequence without confusion or mistakes which might result if they were all printed the same color.

Since a portion of the keyboard near the end is infrequently used, I make the chart section of a width less than the entire keyboard and where an octave containing a note outside of this portion is played, I vary the indications thereof as indicated by mark $14^e$, which is provided with a hollow center $14^f$ indicating an octave.

The words of the stanza corresponding to the notes indicated on the chart are printed at the side as indicated by numeral 25. The conventionally printed note group corresponding to these notes arbitrarily indicated on the chart, is printed in a convenient location on the corresponding chart section as indicated by numeral 26, the purpose of this being to photograph on the mind of the pupil the conventionally printed notes corresponding to the note or notes which he is learning to play from the use of the chart, so that in addition to learning that particular piece of music he will acquire the ability to interpret conventionally printed music.

It will be noticed that some of the notes indicated at $14^a$, etc., are of different width, this being for the purpose of indicating pictorially the relative time value of the notes, while 9 represents the accent line.

I do not wish to be restricted to the embodiment of my invention described and shown except as defined in the appended claims.

What I claim is:—

1. A chart having indicated thereon marks in groups, the marks of each group being in lateral alinement, the chart being co-extensive in width with the keyboard of a piano, or the like, the marks being located on the chart to aline with the keys corresponding to the indicated notes, succeeding lateral groups of marks being printed in different colors.

2. A chart having indicated thereon marks in groups, the marks of each group being in lateral alinement, the chart being co-extensive in width with a desired portion of the keyboard of a piano, or the like, the marks being located on the chart to aline with the keys corresponding to the indicated notes, the marks representing notes to be played by the left hand of the player being constructed of different configuration than those representing the right hand.

3. A chart having indicated thereon marks in groups, the marks of each group being in lateral alinement, the chart being co-extensive in width with the keyboard of a piano, or the like, the marks being located on the chart to aline with the keys corresponding to the indicated notes subsequent lateral groups being printed in different colors.

4. A chart for instruction in playing a piano or the like comprising a plurality of sections each having thereon marks in groups, the marks of each group being in substantial lateral alinement, the chart sections being co-extensive in width with a desired proportion of the key-board of said piano or the like, the marks being located on the chart section to aline with the keys corresponding to the indicated notes, the indications on each chart section representing a separable portion of a musical selection, the same section being utilized for the repetition of the portion indicated thereon in said musical selection.

In testimony whereof, I have subscribed my name.

EDWIN M. SCHANTZ.